N. T. WILEY.
BRAKE ROD SUPPORT.
APPLICATION FILED NOV. 4, 1914.
1,167,867.
Patented Jan. 11, 1916.
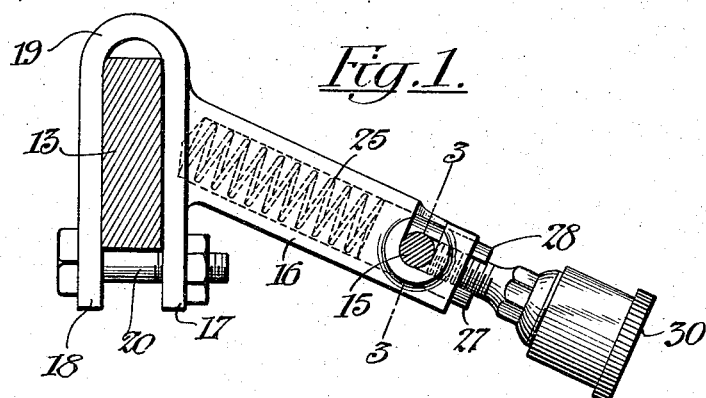
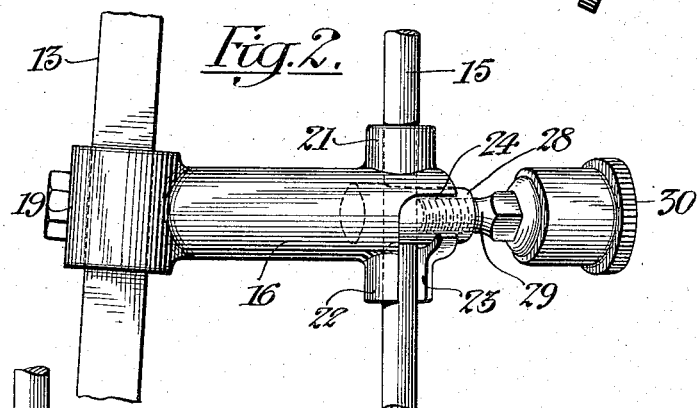
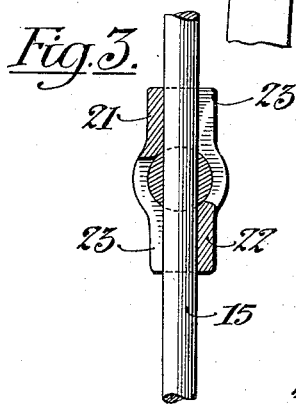
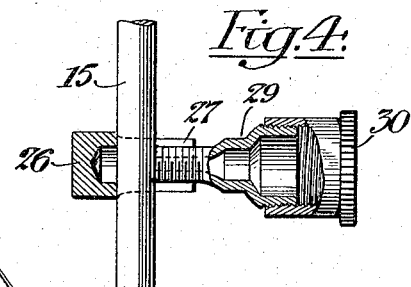
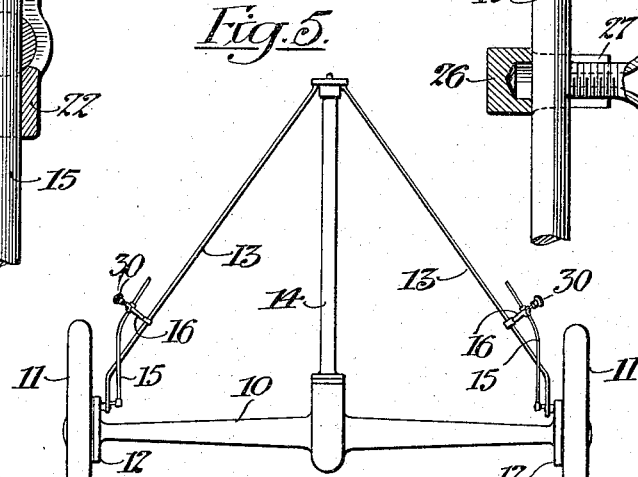
Witnesses:
Inventor
Nathaniel T. Wiley
By his Attorney

UNITED STATES PATENT OFFICE.

NATHANIEL T. WILEY, OF SOMERVILLE, MASSACHUSETTS, ASSIGNOR TO MOTOR SPECIALTIES COMPANY, OF WALTHAM, MASSACHUSETTS, A CORPORATION OF MASSACHUSETTS.

BRAKE-ROD SUPPORT.

1,167,867.  Specification of Letters Patent.  Patented Jan. 11, 1916.

Application filed November 4, 1914. Serial No. 870,233.

*To all whom it may concern:*

Be it known that I, NATHANIEL T. WILEY, a citizen of the United States, and resident of Somerville, in the county of Middlesex and State of Massachusetts, have invented certain new and useful Improvements in Brake-Rod Supports, of which the following is a specification.

My invention is applicable to various types of machines or mechanisms in which it is desired to support a rod and permit of its reciprocation or other movement. In its preferred embodiment, it is primarily designed for supporting the brake rod of a motor vehicle, particularly that type commonly known as a "Ford."

The support, which also acts as a guide, is secured both to the brake rod and to a portion of the frame of the vehicle and one of the main advantages of my improved construction is that this support is capable of being quickly and easily secured in position without necessitating any alteration, removal or change in the construction or the adjustment of either the rod or the frame part of the vehicle. Only a single fastening member is needed as the support is so designed that it may be attached to one of these parts by a predetermined movement of the support in respect to that part and is prevented from being detached except by a reverse movement, but this reverse movement is prevented by the securing of the support to the other part.

Various changes may be made in the details of the construction of my improved device as defined in the appended claims and without departing from the spirit of my invention and therefore I desire the specific form illustrated to be considered merely as one of the various forms which my invention may assume, and desire the drawings and description of the parts there shown, to be considered in an illustrative rather than in a limiting sense.

Figure 1 is a side elevation of the support with a vehicle frame part and the brake rod shown in section. Fig. 2 is a top plan view of the parts shown in Fig. 1. Fig. 3 is a transverse section through the support taken on the line 3—3 of Fig. 1. Fig. 4 is a sectional detail of the grease cup and its support, and Fig. 5 is a plan view of a portion of a vehicle frame and illustrating one use of my improved device.

The vehicle frame illustrated in Fig. 5 includes a rear axle support 10, rear wheels 11 and brakes 12 associated with each wheel. Braces 13, 13 extend diagonally rearwardly from the front end of a centrally-disposed, longitudinally-extending frame member 14 to the outer ends of the transverse axle-supporting frame member 10 and are rigidly secured to both frame members so as to form a rigid part of the vehicle frame. For operating the brakes, brake rods 15 extend rearwardly from suitable controlling levers or pedals (not shown), and by means of which the brake rods may be moved longitudinally. None of these parts involve any portion of my invention and are illustrated merely to show typical parts in connection with which my invention may be employed.

My improved device is designed for attachment to a brake rod 15 and to a frame member or brace 13 and is so designed that the support may be attached without making any alterations or changes in either the brake rod or the brace, and without removing, loosening or in any way changing the adjustment thereof. Thus, the device may be readily and quickly attached to vehicles already in use and without necessitating the employment of a machinist or other skilled workman.

In the specific form illustrated, my improved support includes a body portion or bracket 16, preferably of tubular form, and having means at one end for detachably securing said body portion to the frame brace 13 and means at the opposite end for detachably connecting it to the brake rod. The bracket is preferably of cast metal and the means for attaching it to the brace 13 includes two spaced leaves or plates 17 and 18, constituting jaws, spaced apart to a distance substantially equal to the thickness of the brace so that said brace may be inserted therebetween. By forming the two jaws integral and connecting them together by a curved intermediate portion 19, the free ends of the jaws may be moved toward and from each other to a sufficient extent to permit of the desired clamping action on the brace. As shown, the body of the bracket extends outwardly and downwardly from the outer surface of the jaw 17 and the free ends of the two jaws are connected by a bolt 20. Upon tightening the nut of this bolt, the jaws are not only drawn together to clamp the bracket rigidly to the brace 13, but the bolt itself prevents the separation of the brace and bracket even if the nut should become loosened so that the jaws do not properly clamp. By making the jaws open downwardly, the bracket hangs upon the brace and will be retained even though the bolt should be lost out.

The bracket at its opposite end is, as previously stated, adapted to be detachably secured to the brake rod, and this is preferably accomplished by so designing the bracket that a predetermined movement of the bracket in respect to the rod connects the two. As shown, the bracket has bosses 21 and 22 extending outwardly from opposite sides adjacent to the end and in alinement with each other, and through these bosses is an aperture of such size as to permit the free sliding of the brake rod therethrough. The two bosses are each provided with a slot 23 extending lengthwise thereof and communicating with slots 24 disposed between the two bosses and extending lengthwise of the bracket from the free end thereof. The slots are thus of bayonet form and are of a width substantially equal to the diameter of the brake rod so that the bracket may be moved endwise to cause the brake rod to enter the ends of the slots 24 and may then be rotated about the axis of its body portion to cause the brake rod to enter the slots 23 and come into a position co-axial with the bosses. The bracket may then be rotated about the brake rod as an axis until the jaws pass down over the brace bar 13 and the bolt 20 may then be applied and tightened. The brake rod and brace may be slightly and easily distorted to permit the bracket to spring into place on the brace if necessary.

It will be noted that the bracket cannot be removed from the brake rod except by rotating said bracket about the axis of its body portion and this rotation cannot take place when the bracket is fastened to the brace. By making the jaws 17 and 18 at an acute angle to the body portion, the engagement of the jaws with the brace will effectively prevent such a rotation even though the bolt 20 should be accidentally removed.

As far as the mere supporting and guiding of the bracket is concerned, no other part need be employed except the single bracket and the bolt 20 above referred to. To prevent rattling and to facilitate the free movement of the brake rod through the bracket, I preferably provide a spring and a lubricating device. As shown, the body portion of the bracket is made hollow and receives a spring 25 and a plug 26. The plug has a body portion slidable into the open end of the body of the bracket, which open end is of somewhat larger diameter than that of the brake rod. The plug is slotted lengthwise so as to form two jaws 27 and 28 between which the brake rod may be inserted. A grease cup 29 is provided with a threaded stem engaging with the entire surface of the two jaws 27 and 28 so as to be held in place and so as to close the space between the ends of the jaws, leaving a passageway through which the brake rod may move past the end of the grease cup. The outer end of the grease cup may be closed by a threaded cap 30 so designed that when rotated, it operates to force the grease from the grease cup through the same into engagement with the side of the brake rod. The spring 25 which is placed within the body portion of the bracket engages with the bottom of the chamber and with the end of the plug 26 and tends to force the latter outwardly. This causes the brake rod to be pressed against the side of the bore within the bosses 21 and 22, but the side receiving the pressure is the one to which the grease is applied from the grease cup so that the part most in need of lubrication receives the maximum degree of grease. The spring, in so holding the brake rod, effectively insures the device against rattling.

In applying my improved device to a car or other machine or mechanism, the plug is first slipped over the brake rod so that the latter lies between the jaws 27 and 28. The grease cup is then screwed into position between the jaws so as to effectively prevent the removal of the plug 26 from the brake rod. The spring is then inserted in the chamber of the bracket and the bracket is brought into position so that the brake rod enters the two slots 24 and the spring is compressed until the brake rod reaches the inner ends of these slots. The bracket is then rotated about its own axis, and then swung about the brake rod as an axis, as above described.

Having thus described my invention what I claim as new and desire to secure by Letters Patent, is:

1. A rod support, including a bracket having a rod receiving opening extending therethrough and bayonet slots leading from the end of said bracket to said opening and through which said rod may pass in assembling the parts.

2. In combination a brake rod support including a tubular bracket having oppositely disposed bayonet slots adjacent to one end, a brake rod disposed within said slots, and means at the opposite ends of said support for rigidly holding the latter.

3. In combination, a brake rod, a bracket having a rod receiving opening extending therethrough, and bayonet slots leading to said opening and through which said rod may pass in securing the support to the rod, and means for attaching said support to a frame part of the vehicle.

4. In combination, a vehicle frame part, a brake rod adjacent thereto, a rod support having a rod receiving opening, and bayonet slots leading to said opening and means for securing said support to said vehicle frame part.

5. In combination, a frame part in the form of a bar, a longitudinally movable rod adjacent thereto and means for supporting said rod from said bar, said means including a bracket having oppositely disposed bayonet slots to receive said rod upon the proper movement of the bracket in respect to the rod and means for securing said bracket to said bar after the latter has been secured to said rod.

6. In combination, a frame part in the form of a bar, a longitudinally movable rod adjacent thereto, and means for supporting said rod from said bar, said means including a bracket having oppositely disposed slots to receive said rod upon the proper movement of the bracket in respect to the rod and means for securing said bracket to said bar after the latter has been secured to said rod.

7. In combination, a frame part in the form of a bar, a longitudinally movable rod, and means for supporting said rod from said bar, said means including a bracket having one end adapted for interlocking engagement with said rod upon a predetermined relative movement of the bracket in respect to the rod and means for attaching said bracket to said bar after the latter has been secured to said rod.

8. In combination, a frame part, a longitudinally movable bar and means for supporting said bar from said frame part, said means including a bracket having one end thereof adapted for interlocking engagement with said rod upon a predetermined movement of said bracket in respect to said rod and a pair of clamping jaws adapted to receive said frame part therebetween upon a swinging movement of said bracket about said rod as a center after the attachment of the bracket to the rod.

9. In combination, a frame part, a movable rod, and a bracket having a bayonet slot adapted to receive and retain said rod and a pair of jaws adapted to receive said frame part.

10. A brake rod support, including a tubular bracket having bayonet slots adjacent one end adapted to receive and retain a brake rod, and a spring within said bracket and tending to prevent relative movement of said rod and said bracket.

11. In combination, a brake rod and a support therefor, including two telescoping members, one of said members having an opening through which said brake rod extends and the other of said members telescoping therewith and having a bayonet slot receiving said brake rod, and a spring normally tending to prevent relative longitudinal movement of said members.

12. In combination, a brake rod, a bracket, a member carried by said bracket and having an open-ended slot receiving said brake rod, and a grease cup closing the end of said slot.

13. In combination, a brake rod, a tubular bracket having bayonet slots receiving and retaining said brake rod, a plug within said bracket and encircling said brake rod, and a grease cup carried by said plug.

14. In combination, a brake rod, a tubular bracket having bayonet slots receiving and retaining said brake rod, and a plug within said bracket and encircling said brake rod.

15. In combination, a brake rod, a tubular bracket having bayonet slots adjacent to one end thereof, for receiving and retaining said brake rod, a spring for pressing said brake rod outwardly toward the free end of said bracket, and a grease cup telescoping with the free end of said bracket for lubricating the portion of said brake rod within said bracket.

16. In combination, a brake rod, a tubular bracket having bayonet slots adjacent to one end thereof for receiving and retaining said brake rod, and a grease cup telescoping with the free end of said bracket for lubricating the portion of said brake rod within said bracket.

Signed at Somerville, in the county of Middlesex and State of Massachusetts this 29 day of Oct. 1914, A. D.

NATHANIEL T. WILEY.

Witnesses:
MARY R. HARRIS,
CELIA HARRIS.

Copies of this patent may be obtained for five cents each, by addressing the "Commissioner of Patents, Washington, D. C."